Patented July 2, 1940

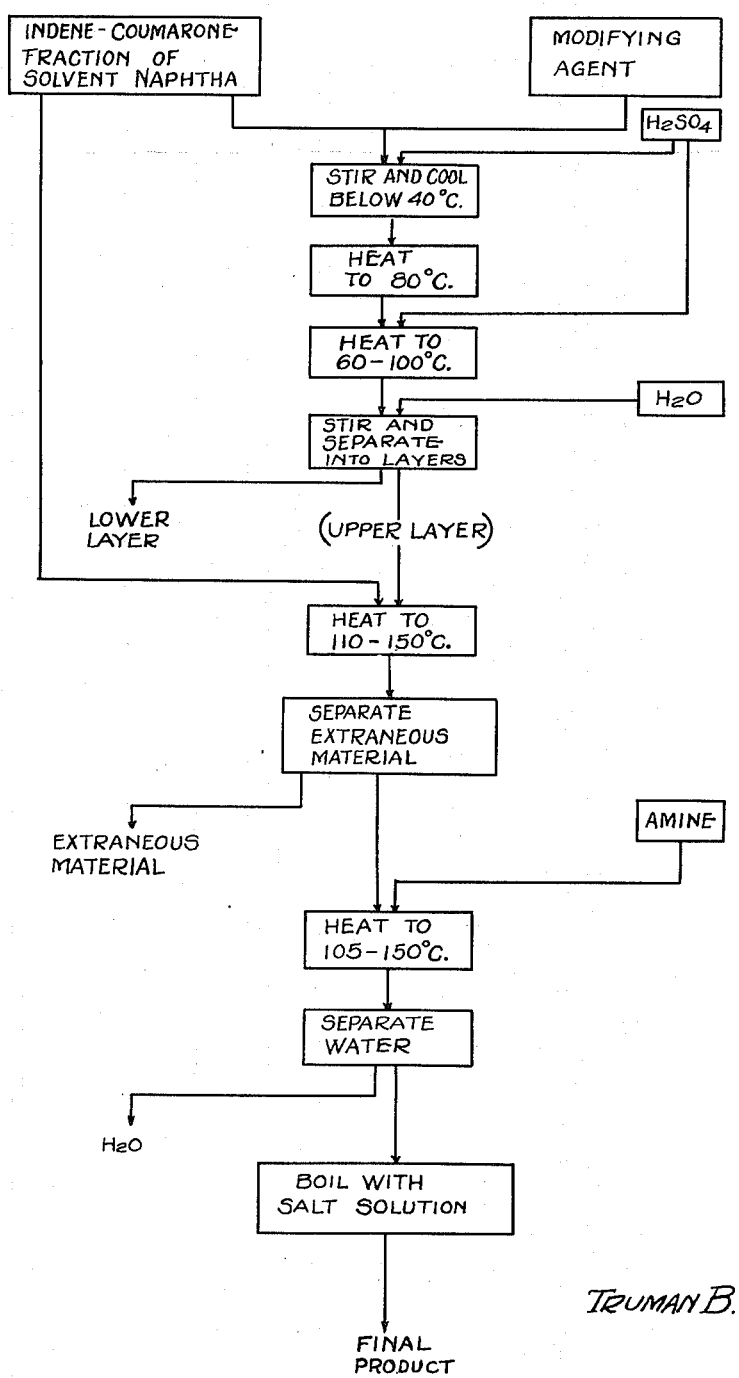

2,206,589

UNITED STATES PATENT OFFICE 2,206,589

PETROLEUM DEMULSIFYING REAGENT AND PROCESS

Truman B. Wayne, Houston, Tex.

Application January 2, 1934, Serial No. 705,028

21 Claims. (Cl. 196—4)

This invention relates primarily to a process of resolving petroleum emulsions of the character commonly encountered in the production, handling and refining of petroleum. It also relates to certain products suitable for use as petroleum emulsion breakers and wetting agents.

The principal object of this invention is to provide an improved process and reagents for treating petroleum emulsions to separate them into their component parts of oil and water.

An important object of this invention is to provide reagents suitable for use as wetting agents and as emulsifying agents in the production of oil-in-water emulsions.

In my prior United States Patents Nos. 1,912,330, issued May 30, 1933, 1,919,871, issued July 25, 1933 (Reissue Patent 20,717), and 1,937,259, issued November 28, 1933, I have disclosed processes of resolving petroleum emulsions involving the use of complex condensation products which were generically described in such patents as "modified synthetic resins." These condensation products were prepared by the condensation of two or more organic bodies containing resinophore groups in the presence of other chemical bodies capable of introducing modifying groups into the resinoid molecule. It was pointed out that one or more of these modifying groups might be selected from the group comprising alkyl, cyclo-alkyl and aralkyl residues. One or more sulfonic groups, and in some cases a carboxyl group, were also indicated as desirable.

In my prior patents referred to, the production of the condensation products was based on the use of substances of the type described selected from the well-known group of compounds known to undergo such reactions, e. g., polyhydric alcohols, aldehydes, aldols, ketones, aromatic hydroxy bodies, unsaturated higher aliphatic acids, cyclic carboxylic acids, amines, amides, and their substituted derivatives. All of these condensation products were modified synthetic resins, differing from the synthetic resins in that they were not hard and insoluble and non-dispersible in water.

The present invention is based on my discovery of the wetting and petroleum emulsion breaking qualities of a class of substances which can broadly be defined as "modified paracoumarone resins." The substances which I have found suitable for the purpose described resemble the paracoumarone resins of commerce structurally but they differ therefrom in that modifying groups are present in the resinoid molecule which render the substances soluble or dispersible in water. In all instances the substances are dispersible in water, being either directly soluble or colloidally soluble in water. The colloidally soluble substances may or may not be oil-soluble depending upon the nature and extent of the modification of the paracoumarone resin, as will more fully hereinafter appear.

The ordinary paracoumarone resins of commerce are obtainable in various forms ranging from a viscous liquid to a hard, brittle substance. These materials are substantially insoluble and non-dispersible in water. The paracoumarone resins are strictly polymerized products and are not embraced within the class known as "synthetic resins" which are prepared by reaction between two or more dissimilar substances, such as, for example, the resin prepared from phthalic anhydride and glycerol. Paracoumarone resins are produced by the polymerization of coumarone and indene, and their homologues, present in a special cut of solvent naphtha boiling between 160° and 180° C., although in many instances the fraction may have a distillation range of say 5 per cent. below 160° C. to approximately 200° C. The polymerization of the resin-forming substances in the special fraction of solvent naphtha is generally effected with sulfuric acid.

None of the paracoumarone resins of commerce are suitable as wetting agents or emulsion breakers for petroleum emulsions. However, I have discovered that if the polymerization of the polymerizable substances in the special fraction of solvent naphtha referred to is conducted in the presence of certain modifying substances, of the type set forth below, a soluble or dispersible product is obtained which is of great value in resolving petroleum emulsions. The effectiveness of this general class of reagents, which I have termed "modified paracoumarone resins," appears to be attributable to the high colloidality and wetting effect of the reagents. These properties, in addition to a pronounced hydrotropic effect, render the products unusually effective in wetting the hydrophobe colloid at the interface and reversing the angle of curvature, thus breaking the petroleum emulsions.

As is well known, in the distillation of coal tar there is obtained a distillate fraction commonly referred to as solvent naphtha from which is obtainable a special cut or fraction, boiling say between 160° and 200° C., which contains coumarone, indene and their homologues, and also cyclic and polycyclic hydrocarbon compounds of the aromatic and heterocyclic series, such as phenols and naphthalene. This special cut or distillate fraction may for the purpose of convenience be referred to as an indene-coumarone fraction of solvent naphtha. As briefly indicated above, it is this fraction which is employed in the production of the paracoumarone resins of commerce. Similarly, it is this fraction which I preferably employ in the production of the modified paracoumarone resins used in the practice of the present invention.

In the practice of the present invention, I polymerize the polymerizable constituents of an indene-coumarone fraction of solvent naphtha with a suitable polymerizing agent such as sulfuric acid, or the like, but preferably concentrated sulfuric acid, in the presence of a modifying agent capable of introducing a group or linkage into the resinoid molecule which will prevent the production of a resin which is non-dispersible in water. Among the modifying agents which I have found suitable for use are aliphatic alcohols, such as isopropyl, butyl, and amyl alcohols; corresponding olefines, such as propylene, butylene, and amylene; alkyl halides or haloid esters of aliphatic alcohols, such as butyl chloride and amyl chloride; aromatic alcohols, such as cyclohexanol and methyl hexalin; aralkyl alcohols such as benzyl alcohol and phenyl methyl carbinol; aralkyl halides or haloid esters of aralkyl alcohols such as benzyl chloride and xylyl chloride; cyclic alcohols, such as cyclopropanol and cyclobutanol; aromatic sulfonic acids, such as phenol sulfonic acid and naphthalene sulfonic acid; nuclear-substituted derivatives of aromatic sulfonic acids, such as dibutyl naphthalene sulfonic acid and esters thereof; and sulfo-fatty acids, such as sulfo-oleic and sulfo-ricinoleic acid.

As a result of the action of a polymerizing agent on an indene-coumarone fraction of solvent naphtha together with one or more modifying substance of the character referred to, the polymerizable or resin-forming substances in the fraction of solvent naphtha are simultaneously polymerized with the introduction of one or more modifying groups or linkages into the resinoid molecule, as a result of which a water-dispersible or water wettable product is produced. However, I prefer to further modify the product, preferably by continuing the treatment at an elevated temperature to react upon one or more of the unaltered hydrocarbon compounds present, notably naphthalene, with the consequent production of a more complex condensation product resulting from the reaction of the thus altered hydrocarbon compound with the modified paracoumarone resin. Thereafter, the product is preferably sulfonated. The resulting product, either as such or in the form of its salt or ester is suitable as an emulsion breaker, but I prefer to further treat the product by heating it with an additional portion of an indene-coumarone fraction of solvent naphtha to polymerize the resin-forming substances therein and condense the same with the previously prepared product.

If desired, the modified paracoumarone resins prepared in accordance with the present invention may be further modified by condensing them with amines which may be selected from the aliphatic, aromatic, or heterocyclic series, preferably hydroxy and non-hydroxy alkyl, aryl, and aralkyl amines.

The accompanying drawing shows a flow sheet of an illustrative embodiment of this invention.

In the preferred practice of the present invention, a flow sheet of which is shown in the accompanying drawing, I initially polymerize the resin-forming constituents of an indene-coumarone fraction of solvent naphtha in the presence of a modifying substance capable of introducing one or more alkyl groups into the resinoid molecule formed. I prefer to employ an aliphatic alcohol but I may also employ a corresponding olefine or a corresponding halide in the well-known Friedel and Crafts synthesis. Where, as is preferred, an aliphatic alcohol or a mixture of aliphatic alcohols is employed, two or more molecular proportions of the aliphatic alcohol or mixtures of alcohols are mixed with an indene-coumarone fraction of solvent naphtha corresponding to one mol of coumarone ($C_8H_6O$), assuming that the solvent naphtha contains 50 per cent. of polymerizable substances, calculated as coumarone, and one mol of naphthalene. Sulfuric acid is slowly added, while stirring and cooling preferably below 40° C., in approximately the amount necessary to convert the alcohol or alcohols into corresponding alkyl hydrogen sulfate or sulfates. The strength of acid used will depend upon the alcohol used and on the amount of water it contains. As a general rule, the strength of the sulfuric acid must be decreased as the number of carbon atoms in the alcohol increases, and it is also known that the stability of the hydrocarbon chain decreases from the primary to the tertiary alcohols. An acid strength of approximately 70 per cent. appears to be best where tertiary amyl alcohol is employed, whereas 98 per cent. sulfuric acid appears to be best where commercial isopropyl alcohol containing approximately 12 per cent. of water is used.

When the sulfuric acid is added to the mixture of alcohol and the indene-coumarone fraction of solvent naphtha, polymerization of the indene-coumarone fraction progresses simultaneously with the formation of the alkyl hydrogen sulfate, especially when the stronger concentrations of acid are used. As a result of the sulfuric acid treatment, an alkylated paracoumarone resin is produced and is present in the mass at this stage as a bright, reddish-colored oil. An excess of alkyl hydrogen sulfate is usually present at this stage. If a sample of the alkylated paracoumarone resin is removed from the mass it will be found to be water wettable and easily dispersible in water as a milky, colloidal solution which is quite stable, in contrast to the nature of the resin prepared from another portion of the same indene-coumarone fraction polymerized with sulfuric acid in the absence of an alcohol or other modifying agent.

After the treatment described, I prefer to heat the mass slowly to approximately 80° C. to alkylate previously unchanged hydrocarbon compounds present. For example, when the mass is heated to approximately 80° C., unchanged naphthalene present melts and is readily alkylated by the alkyl hydrogen sulfate present. The alkylated naphthalene apparently condenses with the modified paracoumarone resin, the oily, red liquid formed apparently being a complex alkyl paracoumarone-naphthalene resin. There is substantial basis for believing that this is the character of product produced. For example, it is known that naphthalene and a reactive substance such as furfural when heated with insufficient sulfuric acid to effect sulfonation will produce a resin and since, like furfural, coumarone contains the highly reactive furfurane group,

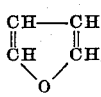

the course of the reaction described above is undoubtedly correct. This product is also water-wettable and can be used as an emulsion breaker.

The oily, red liquid just described is then sulfonated with sufficient sulfuric acid, oleum, or chlorosulfonic acid to introduce one or more sulfonic groups and further polymerize the molecule. The sulfonation is preferably conducted with sufficient acid and at a temperature suitable for the production of a sulfonic acid which is entirely stable to calcium and magnesium salts in dilute solution. This property of stability to calcium and magnesium salts in dilute solution appears to be determined by the number of sulfonic groups introduced into the complex molecule of the types described containing alkyl groups, and is preferred in order to obviate loss of the reagent by the formation of insoluble precipitates with calcium and magnesium salts contained in the brines encountered in oil field emulsions. Moreover, the sulfonation of the product insures the maximum wetting and spreading effect at the interfaces of the emulsion. The sulfonation may be conducted under various conditions of operation but I have found it advisable to employ an excess of concentrated sulfuric acid and to heat the mass to say 60° C. to 100° C.

The resulting mass containing an excess of sulfuric acid is then diluted with water and stirred to effect separation of an upper layer containing the desired product together with a small quantity of dilute sulfuric acid, and a lower layer containing the excess of diluted sulfuric acid in which is dissolved any free naphthalene sulfonic acid and other products which did not condense sufficiently to separate into the upper layer. The aqueous acid layer is withdrawn and the upper layer is recovered.

The product present in the recovered upper layer is suitable for use in its acid state or in the form of its salt or ester for the treatment of some petroleum emulsions, but owing to its high solubility in water and even in the oil field brines it is not my preferred type of treating agent. The most successful type of treating agent, in general, is that which forms highly colloidal, viscous water solutions when made up to about 10 per cent strength, and which also possesses oil solubility to varying extents. Accordingly, the upper layer referred to above is preferably subjected to further treatment to produce the preferred type of product.

Assuming that the upper layer prepared as above described consists of a complex molecule, which is substantially correct although there are undoubtedly smaller proportions of the simpler alkylated aromatic sulfonic acids present, a quantity of the upper layer corresponding to the molecular proportions of the substances originally used in preparing the sulfonated alkyl resin, corrected of course for its combined sulfur and water content, is then mixed with from 1 to 3 additional molecular proportions of an indene-coumarone fraction of solvent naphtha (calculated on the basis of its coumarone content), and is heated at a temperature of approximately from 110° C. to 150° C. at atmospheric or increased pressure, depending on the properties of the product desired, to polymerize the resin-forming substances in the additional portion of solvent naphtha and condense the same with the acidic alkyl resin above described. The heating may be carried on in a manner allowing the production of an oily resin with varying degrees of solubility in water or oil. For example, if the heating is conducted at atmospheric pressure, a water-soluble product is formed. If the heating is conducted at a substantial super-atmospheric pressure, an oil-soluble product is produced. If desired, small amounts of sulfuric acid may be used to aid in the polymerization and condensation.

The paracoumarone resins, as a class, possess considerable solubility in oil and other immiscible solvents, but when prepared in modified form as herein described, they may be prepared in various modifications possessing a wide range of solubilities ranging from water-soluble to completely oil-soluble although fully wettable by water. It will thus be apparent that a new and novel series of petroleum emulsion breakers and wetting agents have been provided.

In some instances it has been found desirable to further modify the complex condensation products as described above, particularly for the purpose of controlling or regulating their solubility in water and oil. I have discovered that a satisfactory means of modifying and controlling the properties of these modified resins is provided by condensing them with suitable amines. These amines may be selected from the aliphatic, aromatic and heterocyclic series, and the nature of the completed condensation product may be greatly influenced by the properties of the amines selected. For example, a highly sulfonated water-soluble modified resin of the type above described may be condensed through the well-known acylation reaction with an oil-soluble primary or secondary alkyl amine, such as mono- or di-amyl-amine. Products of this type ordinarily possess the property of dissolving in water to form stable colloidal solutions, and are also oil-soluble. Conversely, if a modified resin possessing considerable oil solubility and relatively low water solubility is condensed through the well known acylation reaction with an aliphatic hydroxy amine or is neutralized with a water-soluble quaternary ammonium compound, its water solubility is enhanced. In this manner, the properties of a modified resin of the character described above may be substantially altered with respect to water solubility and oil solubility, so that a final product possessing the desirable characteristics for a particular purpose may be readily produced.

As indicated above, the choice of amine to be condensed with the modified paracoumarone resin will depend upon the particular characteristics of the modified resin under treatment and the properties sought to be imparted thereto. Where it is desired to impart water solubility to a modified resin under treatment, I suggest the use of such amines as trimethylamine, diethanolamine or the like. Where it is desired to impart oil solubility to a modified resin under treatment, I suggest the use of an amine such as monoamylamine, diamylamine or the like. In general, I prefer to condense the modified alkyl paracoumarone resin with an amine selected from the group comprising hydroxy and nonhydroxy alkyl, aryl and aralkyl amines, the choice of the particular amine being governed by the properties of the modified resin under treatment, whether water or oil soluble, and the nature of the treating agent required. From the foregoing suggestions as to the type of amine to be employed for securing oil solubility or water solubility, as the case may be, no difficulty will be encountered by those skilled in the art in selecting an amine to accomplish the desired purpose.

Where it is desired to condense an amine with the condensation product resulting from the final condensation of the alkyl paracoumarone resin with an additional portion of solvent naphtha, as described above, the condensation product resulting from this final condensation is first freed from any excess of free sulfuric acid or other extraneous substances which appear in the aqueous layer which ordinarily forms after the final condensation described. When so freed from the aqueous layer and the extraneous substances present therein, the final condensation product is then condensed with the amine which has been selected to impart to the condensation product the desired properties with respect to water solubility or oil solubility. If the condensation with the amine is carried out at an elevated temperature, say from 105° C. to 150° C., acylation of the amine occurs and water is split off from the hydroxy group of the sulfonic group attached to the resinous condensation product, and the hydrogen atom attached to the nitrogen atom of the amine. Moreover, it appears that there is a direct linking between the sulfur atom of the sulfonyl residue remaining from the sulfonic group and the nitrogen atom of the amine. In preparing the final product for use, the water present is preferably removed and the resulting product finally purified by boiling for from 20 to 60 minutes with a substantially equal volume of a nearly saturated salt solution.

While I have described above the general method employed in producing my new modified paracoumarone resins, I am setting forth below for the purposes of specific illustration an example of preparing a specific product which has been found to be especially suitable as an emulsion breaker and wetting agent. It is to be understood that in this example all parts of ingredients referred to are parts by weight:

*Example*

Approximately 140 parts of commercial isopropyl alcohol are mixed with 120 parts of an indene-coumarone fraction of heavy solvent naphtha. 200 parts of 98 per cent. sulfuric acid are added slowly while stirring and cooling the mass to a temperature below 40° C. and preferably in the neighborhood of 30° C. After all of the sulfuric acid has been added and the mass preferably stirred for a few minutes thereafter, the mass is then slowly heated, say over a period of minutes, up to a temperature of approximately 80° C. This as previously described produces a water-wettable product. Thereafter, 300 parts of sulfuric acid of 98 per cent. strength are added and the mass is heated over a period of about 120 minutes to a temperature of approximately 60° C. This results in sulfonation of the product. The resulting mass is then diluted with approximately 500 parts of water and stirred to effect the separation of the mass into two layers. The upper layer is separated from the lower and recovered.

While the recovered product just referred to, either in its acid condition or as its salt or ester, may be used as a petroleum emulsion breaker, I prefer to further treat the product by mixing it with from 120 to 360 parts of another portion of the indene-coumarone fraction of solvent naphtha initially employed and heat the resulting mass at a temperature of from 110° C. to 150° C., at atmospheric pressure for about 120 minutes or at a pressure of 50 pounds per square inch for about 60 minutes, depending upon the character of product desired.

The resulting modified paracoumarone resin is suitable as a demulsifying agent but I prefer to further condense it with an amine, such as monoamylamine. Prior to such condensation the product is freed from any excess sulfuric acid or other extraneous material present. After such purification the product is condensed with approximately 90 parts of the amine at a temperature of from 105° C. to 150° C. Thereafter, the water is separated from the product and the resulting product is purified by boiling it for say 60 minutes with an equal volume of a substantially saturated salt solution.

The products prepared in accordance with the present invention are particularly efficient demulsifying agents for water-in-oil emulsions such as those encountered in the treatment of emulsified petroleum. Moreover, the products are very suitable as reagents for wetting, scouring and cleaning certain greasy or dirty materials such as textiles, leather or the like. In other words, the products serve as emulsifying agents for substances which will be dispersed in water, i. e., to produce an oil-in-water type of emulsion.

When the improved treating agents prepared in accordance with the present invention are employed for resolving petroleum emulsions, the agents may be used in the proportion of one part of treating agent to from 2,000 to 40,000 parts of petroleum emulsion under actual conditions encountered in oil field or refinery treatment. The treating agents may be added to the emulsions in concentrated form or after diluting with water or oil in the conventional manner. They may be used in any of the numerous ways commonly employed in the treatment of petroleum emulsions. If desired, the new treating agents herein described may be used in connection with, or in admixture with, other substances used in treating petroleum emulsions such as modified fatty acids, sulfo-aromatics, alkylated aromatic sulfonates and the like.

In the foregoing description I have described several probable chemical reactions and while I believe that the course of such reactions is substantially correct, and while the data offered regarding the structure of the so-called "modified paracoumarone resins" appears to be accurate, it is to be understood that the present invention is not dependent on any theory expressed herein as to the course of the reactions or as to the nature of the products except as defined in the appended claims.

As indicated in the foregoing specification, reaction products of the modified paracoumarone resins with amines comprise both the neutralization products wherein no substitution reactions occur, and acylated products wherein hydrogen atoms attached to the amino body are substituted. The term "condensation product" as used in the foregoing specification and appended claims, refers to both types of reaction products resulting from the interaction of the modified paracoumarone resin and a suitable amine.

Where the term "water-soluble" is used herein it is to be understood that the term includes not only actual solubility but also includes the property of forming colloidally hydrated aqueous solutions.

The term "hydrotropic" as employed herein is used in its physico-chemical sense, i. e., as applying to materials which have the property of transforming certain substances normally insoluble in water into clear, watery solutions.

Where reference is made herein to "carboxyl groups" and "sulfonic groups" it is to be understood that this refers to the presence of COOH and $SO_2.OH$ groups, respectively, and also to the products formed when they are neutralized by a metallic base, ammonia or organic amine. Equivalents of these groups are also contemplated.

The reference in the preceding paragraph to an organic amine as a neutralizing agent contemplates only its use in the formation of an amine salt. Where acylation occurs, resulting in splitting off the hydroxy group from a carboxyl or sulfonic group, the resulting product possesses considerably different properties, and specific references to the products of the acylation reaction have been made in the foregoing description.

In accordance with this invention there is employed a modifying agent capable of preventing the production of a resin which is water-repellant; this agent is capable of introducing into the resinoid molecule of the polymerization products produced in accordance with the present invention, a group or linkage which will render the substances water-wettable or dispersible in water, such modifying agent comprising: an aliphatic alcohol, olefine, alkyl halide, aromatic alcohol, aryl halide, aralkyl alcohol, aralkyl halide, aromatic sulfonic acid, nuclear-substituted derivative of an aromatic sulfonic acid or ester thereof, or a sulfo-fatty acid. The resinoid body is, therefore, structurally modified so as to be water-wettable and self-dispersible in water; that is molecular structure of the resinoid body has been modified during polymerization of the resin-forming constituent, by incorporating in the resinoid molecule one or more modifying groups or linkages to secure that result.

It will thus be seen that the paracoumarone resinoid body has been modified chemically as well as physically. The ordinary paracoumarone resins of commerce are water repellent instead of water-wettable; they are, therefore, not self-dispersible in water and are, therefore, incapable of forming wettable films at the interfaces of the emulsion. It will therefore be clear that such resins are incapable of resolving emulsions. The paracoumarone resin which has been structurally modified by molecular substitution is, however, water-wettable, so that it will form water-wettable films at the interfaces of the emulsion so as to efficiently resolve the same. The reagent embodying this invention does not, therefore, require the use of any additional agent such as an emulsifying agent to effect its dispersion in water.

While I have described in detail the preferred practice of my process it is to be understood that the details of procedure, the ingredients and proportions of ingredients employed, and the arrangement of steps may be considerably varied without departing from the spirit of the invention or the scope of the subjoined claims.

I claim:

1. A process of resolving petroleum emulsions, comprising subjecting a petroleum emulsion to the action of a water-wettable alkylated paracoumarone resin.

2. A process for producing a compound of the character described, comprising subjecting a substance rich in coumarone and indene to the action of an alkylating agent in the presence of a polymerizing catalyst.

3. A process of resolving petroleum emulsions, comprising subjecting a petroleum emulsion to the action of a water-wettable alkylated paracoumarone-naphthalene resin.

4. A process for producing a compound of the character described, comprising subjecting a substance rich in coumarone and indene to the action of an alkylating agent in the presence of a polycyclic aromatic hydrocarbon and a polymerizing catalyst.

5. A process for producing a compound of the character described, comprising subjecting a substance rich in coumarone and indene to the action of an alkylating agent in the presence of a sulfonating agent.

6. A process for producing a compound of the character described, comprising subjecting a substance rich in coumarone and indene to the action of an alkylating agent in the presence of a sulfonating agent and reacting an amine with the resultant sulfo-derivative.

7. A process for producing a compound of the character described, comprising subjecting a substance rich in coumarone and indene to the action of an alkylating agent in the presence of a sulfonating agent and reacting an amine with the resultant sulfo-derivative, the sulfonation and the reaction with the amine being controlled in order to selectively adjust the water-dispersible and oil-soluble characteristics respectively.

8. A petroleum emulsion breaker and wetting agent, comprising a water-wettable alkylated paracoumarone resin.

9. A petroleum emulsion breaker and wetting agent, comprising a water-wettable paracoumarone-napthalene resin which has been structurally modified by molecular substitution.

10. A petroleum emulsion breaker and wetting agent, comprising a water-wettable sulfonated water-dispersible paracoumarone resin which has been structurally modified by molecular substitution.

11. A petroleum emulsion breaker and wetting agent comprising a water-wettable and oil-soluble paracoumarone resin which has been structurally modified by molecular substitution.

12. A petroleum emulsion breaker and wetting agent, comprising a water-wettable condensation product of an amine with an alkylated paracoumarone resin containing a sulfo group.

13. A petroleum emulsion breaker and wetting agent comprising a water-wettable modified paracoumarone resin characterized by the presence in the resinoid molecule of a modifying group or linkage derived from a modifying agent capable of preventing the formation of a resin which is water repellent.

14. A petroleum emulsion breaker and wetting agent comprising the condensation product of an amine with a modified paracourmarone resin containing a sulfonic group and a group or linkage derived from a modifying agent capable of preventing the formation of a resin which is not self-dispersible in water, said amine being capable of modifying the solubility characteristics of the modified paracoumarone resin.

15. A petroleum emulsion breaker and wetting agent comprising a complex condensation product resulting from condensing a polymerization product resulting from the action of sulfuric acid on an indene-coumarone fraction of solvent naphtha together with a modifying substance capable of preventing the formation of a resin which is not self-dispersible in water, with an amine capable of modifying the solubility characteristics of said polymerization product, said condensation product being characterized by the presence of at least one sulfonyl residue and at least one group or linkage derived from said modifying substance, and being further characterized by a direct linkage between the sulfur atom of said sulfonyl residue and the nitrogen atom of said amine.

16. The method of preparing a modified paracoumarone resin which comprises subjecting a mixture of an indene-coumarone fraction of solvent naphtha and a modifying agent to the action of concentrated sulfuric acid at a temperature not in excess of approximately 40° C., said modifying agent being capable of preventing the formation of a resin which is not self-dispersible in water, thereafter raising the temperature of the mass to about 80° C., subjecting the resulting mass to the action of a sulfonating agent at an elevated temperature, diluting the resulting mass with water, permitting the diluted mass to separate into layers, separating and recovering the upper layer, mixing the recovered product with an additional amount of an indene-coumarone fraction of solvent naphtha, heating the resulting mixture at a temperature of approximately from 110° C. to 150° C., substantially removing from the resulting product any excess sulfuric acid or other extraneous material present, and condensing the thus purified product at a temperature of from 105° to 150° C. with an amine capable of modifying the solubility characteristics of such product.

17. In the art of resolving water-in-oil emulsions the process comprising treating the water-in-oil emulsion with a paracoumarone resin which has been structurally modified by molecular substitution to be water wettable.

18. In the art of resolving water-in-oil emulsions the process comprising treating the water-in-oil emulsion with a paracoumarone resin containing a sulfonic group and which has been structurally modified by molecular substitution to be water wettable.

19. In the art of resolving water-in-oil emulsions the process comprising treating the water-in-oil emulsion with a water dispersible modified paracoumarone resin containing a sulfonic group and which has been condensed with an amine capable of modifying the solubility characteristics of the modified resin.

20. The process of resolving water-in-oil emulsions which comprises adding thereto a complex polymerization product resulting from the action of sulfuric acid on an indene-coumarone fraction of solvent naphtha and a modifying agent capable of preventing the production of a resin which is not self-dispersible in water, said polymerization product being characterized by the presence of at least one sulfonic group and at least one modifying group or linkage derived from said modifying agent.

21. The process of resolving water-in-oil emulsions which comprises adding thereto a complex condensation product resulting from condensing a polymerization product resulting from the action of sulfuric acid on an indene-coumarone fraction of solvent naphtha together with a modifying agent capable of preventing the production of a resin which is not self-dispersible in water, with an amine capable of modifying the solubility characteristics of said polymerization product, said condensation product being characterized by a direct linkage between the sulfur atom of a sulfonyl residue and the nitrogen atom of said amine.

TRUMAN B. WAYNE.